US008320540B2

(12) United States Patent
Chen

(10) Patent No.: US 8,320,540 B2
(45) Date of Patent: Nov. 27, 2012

(54) VERIFYING USER IDENTITY USING A REVERSE CALLER ID PROCESS

(75) Inventor: Yingwei Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 338 days.

(21) Appl. No.: 12/599,037

(22) PCT Filed: Nov. 24, 2008

(86) PCT No.: PCT/US2008/084527
§ 371 (c)(1),
(2), (4) Date: Nov. 5, 2009

(87) PCT Pub. No.: WO2009/070529
PCT Pub. Date: Jun. 4, 2009

(65) Prior Publication Data
US 2010/0135477 A1  Jun. 3, 2010

(30) Foreign Application Priority Data
Nov. 27, 2007  (CN) .......................... 2007 1 0194863

(51) Int. Cl.
*H04M 1/56* (2006.01)
(52) U.S. Cl. .............................. 379/142.01; 379/114.14
(58) Field of Classification Search ...... 379/142.01–145
See application file for complete search history.

(56) References Cited

U.S. PATENT DOCUMENTS

| 5,027,387 | A | | 6/1991 | Moll | |
|---|---|---|---|---|---|
| 5,736,932 | A | * | 4/1998 | Bulfer et al. ................. | 340/5.74 |
| 6,393,015 | B1 | * | 5/2002 | Shtivelman ................... | 370/352 |
| 6,731,731 | B1 | * | 5/2004 | Ueshima ....................... | 379/196 |
| 7,116,668 | B2 | * | 10/2006 | Sivalingham ................ | 370/394 |
| 7,215,750 | B2 | * | 5/2007 | Nguyen et al. ........... | 379/142.06 |

(Continued)

FOREIGN PATENT DOCUMENTS

CN  1394067 A  1/2003

(Continued)

OTHER PUBLICATIONS

Chinese Office Action mailed Mar. 3, 2011 for Chinese patent application No. 200710194863.7, a counterpart foreign application of U.S. Appl. No. 12/599,037, 9 pages.

(Continued)

*Primary Examiner* — Yuwen Pan
*Assistant Examiner* — Assad Mohammed
(74) *Attorney, Agent, or Firm* — Lee & Hayes, PLLC

(57) ABSTRACT

The present disclosure provides a method and a system for verifying identity of a user and a system for generating and maintaining verification codes. The method and the system use system-generated caller numbers as verification codes. When an application system needs to verify the identity of a user, the verification system generates a caller phone number and uses a communication switching system to place a call originating from the caller phone number to the user's phone. The user's phone has a caller ID display function to automatically display the caller number, which serves as a user identity verification code. The user provides the received caller number to the application system for user identity verification. No text messaging or other ways of communication is required. The method and the system can achieve reliable user identity verification. A centralized system may support multiple application systems for user identity verification.

20 Claims, 6 Drawing Sheets

U.S. PATENT DOCUMENTS

| | | | |
|---|---|---|---|
| 2002/0035539 A1* | 3/2002 | O'Connell | 705/39 |
| 2004/0174965 A1 | 9/2004 | Brahm et al. | |
| 2005/0094788 A1* | 5/2005 | Lipton et al. | 379/142.01 |
| 2006/0048213 A1* | 3/2006 | Cheng et al. | 726/5 |
| 2006/0153346 A1 | 7/2006 | Gonen et al. | |
| 2007/0220092 A1* | 9/2007 | Heitzeberg et al. | 709/204 |
| 2008/0010687 A1* | 1/2008 | Gonen et al. | 726/28 |
| 2008/0051117 A1* | 2/2008 | Khare et al. | 455/458 |

FOREIGN PATENT DOCUMENTS

| | | |
|---|---|---|
| CN | 1435985 A | 8/2003 |
| CN | 1547402 A | 11/2004 |
| CN | 101127112 A | 2/2008 |
| WO | WO0199382 | 12/2001 |

OTHER PUBLICATIONS

Chinese Office Action mailed Sep. 28, 2010 for Chinese patent application No. 200710194863.7, a counterpart foreign application of U.S. Appl. No. 12/599,037, 8 pages.

Extended European Search Report mailed May 14, 2012 for European patent application No. 08853812.9, 5 pages.

* cited by examiner

VERIFYING USER IDENTITY USING A REVERSE CALLER ID PROCESS

RELATED APPLICATIONS

The present application is a National Stage application of an International Patent Application PCT/US08/84527, filed Nov. 24, 2008, and entitled "VERIFYING USER IDENTITY USING A REVERSE CALLER ID PROCESS", which claims priority benefit from the Chinese patent application No. 200710194863.7, filed Nov. 27, 2007, entitled "METHOD AND SYSTEM FOR VERIFYING USER IDENTITY AND SUBSYSTEM FOR GENERATING VERIFICATION CODE", which applications are hereby incorporated in their entirety by reference.

TECHNICAL FIELD

The present disclosure relates to the fields of information security, and particularly to methods and systems for verifying user identities.

BACKGROUND

The Internet and Internet-based applications, services and functions have been globally expanding at a tremendous pace. Both newly developed industries and traditional industries are becoming more and more reliant on the Internet. Some of these industries and systems handle sensitive information such as electronic commerce, financial services and government affairs. Because the Internet is very different from traditional environments, many malice and even illegal Internet-based behaviors have been spreading with little restriction. The damages arising from such activities have become very serious, and severely hinder the further development of the Internet and the Internet-based applications, services and functions.

Among various illegal Internet-based attacks, illegal acquisition of account information of others has been on the rise. Using methods such as virus, Trojans, frauds and phishing, for example, unauthorized persons can obtain the bank account information of others and steal money from their accounts to incur loss to them. Similar to bank account information, other Internet-based applications are also facing the same threat of illegal attacks.

Due to these activities, simply relying on password-based user identity verification may no longer be sufficient for some operations, functions or services. In order to solve these problems and provide more effective user identity verification, proposals such as digital certificate, dynamic password, dynamic token ring, telephone verification and text message verification have been suggested. Because of the convenience offered, telephone verification and text message verification have received increasing attention and become more popular.

In general, text message verification refers to a technique in which a system sends a verification code to a user in the form of a text message after the user has requested a certain type of an operation, function or service. The user enters the verification code following the instructions given by the system to verify the user identity. The system may continue to complete the fund transfer for the user only after the user has successfully verified the user identity using the verification code sent to him or her. If the user fails to verify the identity using the correct verification code, the system may deny the requested transaction. One example of the type of operation or service that may need such user identity verification is a transfer transaction through an online bank. A fund transfer transaction may be considered a heightened security risk, so the system may require an extra layer of security in addition to the regular password-based logon.

Different from the text message verification, telephone verification sends a verification code through a voice call. When a user requests a transfer transaction through an online bank, for example, a system calls the user and tells the user a verification code for the transaction. It can be done using either a human operator or an automatic voice system. The user hears the verification code and uses it to verify the identification. Only after the user successfully verifies the identification using the verification code will the system continue to complete the related function or service The above two examples of verification methods, namely text message verification and telephone verification, have received widespread use in your various practical environments and conditions, especially in online banks and third-party online payment platforms. However, due to reasons described below, these two verification methods have limitations which prevent further development and expansion of these methods, and affect their effectiveness of identity verification in practice.

Since text message verification does not guarantee arrival of the text messages, message delay or loss often exists. If a text message is not timely arrived to a user, an associated transaction may not proceeds normally and may severely affect user experience. Moreover, the use of the text message verification is greatly limited by the types of the phones used by the users. For example, because most landline phones cannot accept text messages, it may not be possible to promote the text message verification and provide the respective service to users of the landline phones in the short run.

Although telephone verification may prevent risks arising from delay or loss of text messages, the telephone verification suffer an accuracy problem. Since a verification code is sent through voice calling, sometimes it may be hard for a user to hear or memorize the verification code accurately and easily. In addition, because of the existence of different languages and dialects, sending a verification code through voice calling encounters a lot of communication difficulties. For instance, users of some geographical locations may have a poor command of the language (e.g., Mandarin) that is used for voice calling and may have difficulty in listening accurately the verification code being sent. Moreover, telephone verification has a relatively high cost and is not propitious for implementation and promotion. Implementing telephone verification may require long distance calls and even international long distance calls because service platforms provided by service providers are based upon the Internet, and users of the service platforms may spread over the world. Such conditions would mandate high communication costs and can be unacceptable for many service providers.

SUMMARY OF THE DISCLOSURE

Disclosed are a method and a system for user identity verification and for generating and maintaining verification codes. The method and the system use system-generated caller numbers as verification codes. The system generates a caller phone number and uses a communication switching system to place a call originating from the caller phone number to the user's phone. The user's phone has a caller ID display function to automatically display the caller number. The user provides the received caller number to the application system for user identity verification. No text messaging or other ways of communication is required. Using a user identity verification code as a caller number to call a user's caller ID-enabled phone, the process of identity verification can be easier and more reliable with low cost.

One aspect of the present disclosure is a method for verifying identity of a user of an application system. To verify the identity of the user, the application system instructs a verification code system to generate a user identity verification code for the user. A communication switching system uses the generated user identity verification code as a caller number to call a user communication terminal of the user. The user communication terminal may be any communication or computing device that is able to display the caller number. After receiving the caller number, and the user submits it to the application system, which compares the received caller number with the user identity verification code to verify identity of the user.

Another aspect of the present disclosure is a system for verifying identity of a user of an application system. The system includes a verification code system and a communication switching system. The verification code system is used for generating a user identity verification code upon receiving a request from an application system, and for communicating the user identity verification code to the application system. The user identity verification code specifies a caller number. The communication switching system is used for placing a call from the caller number to a user communication terminal which is capable of displaying the caller number upon receiving the call. The contact number of the user communication terminal is associated with the user. The caller number displayed on the user communication terminal enables the application system to verify the user's identity. In one embodiment, a centralized system may support multiple application systems for user identity verification.

Yet another aspect of the present disclosure is verification code system which has a verification code generation unit and a communication unit. The verification code generation unit is used for generating a user identity verification code upon receiving a request from an application system. At least part of the user identity verification code providing a caller number. The communication unit is used for communicating the caller number to a communication switching system and the application system, and instructing the communication switching system to place a call originating from the caller number to a user communication terminal which is capable of displaying the caller number.

The method and system disclosed herein avoids possible losses or delays of a text message inherent in the text message verification and possible failure of user identity verification due to poor receiving accuracy in the telephone verification, and therefore improves the reliability and the work efficiency of user identity verification. Moreover, since the disclosed method allows a user to obtain a user identity verification code without answering a call, the method can reduce the cost and may see wider adoption.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The disclosed methods and systems for verifying a user identity and for generating and maintaining a verification code are described in further details using figures and exemplary embodiments as follows.

Figure 1:
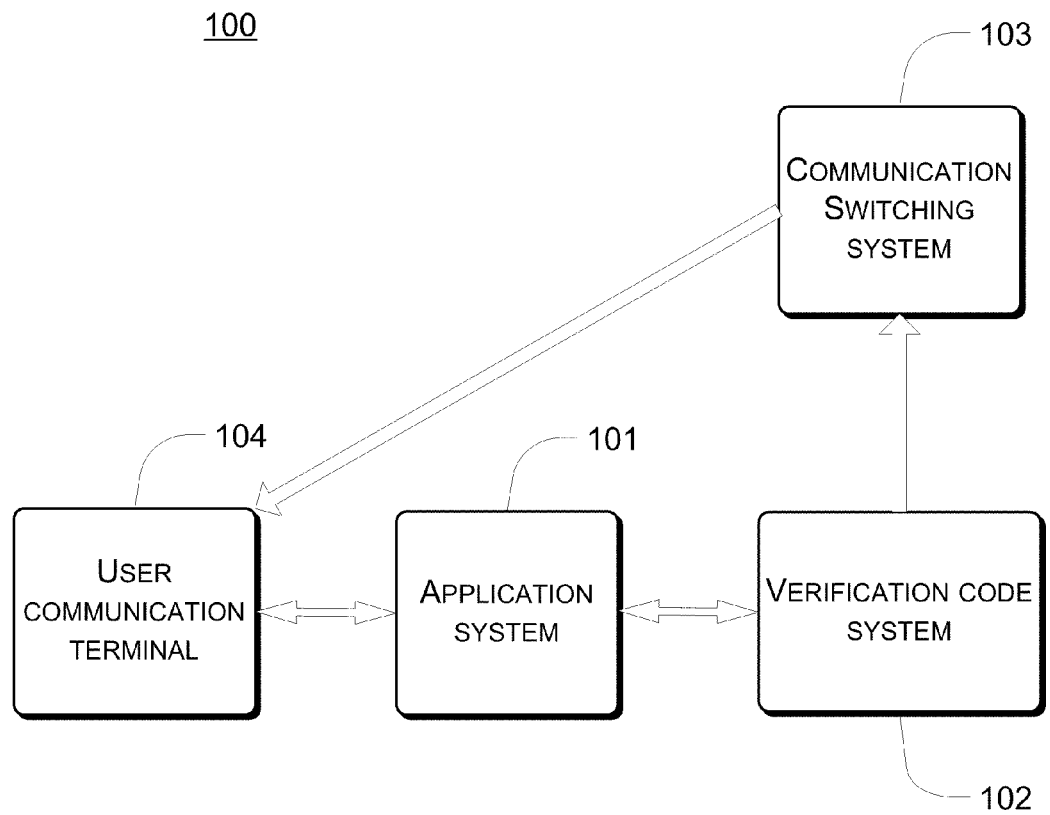
FIG. 1 shows a schematic diagram illustrating the concept of an exemplary method for verifying a user identity.

FIG. 1 shows a schematic diagram illustrating the concept of an exemplary method for verifying the identity of a user. The method involves an environment 100 including an application system 101, a verification code system 102, a communication switching system 103 and a user communication terminal 104.

The application system 101 can be any system that provides an online service to users. An example of the application system 101 is a website providing a financial service such as an online bank account, a payment account or a financial account. The application system 101 is adapted for receiving a logon of a user and for providing the online service to the user after the user has logged on. When the user requests to perform a certain account operation which is deemed to require additional user identity verification, the application system 101 requests to the verification code system 102 for generating a user identity verification code. The application system 101 subsequently obtains the generated user identity verification code from the verification code system 102. Meanwhile, the verification code system 102 communicates the generated user identity verification code to the communication switching system 103.

The communication switching system 103 then makes a call to the user communication terminal 104 using the identity verification code as a caller number. That is, the communication switching system 103 configures the call to the user communication terminal 104 in a way that the call is originated from the caller number. The user communication terminal has a caller ID display function to show the caller number automatically. To verify the user identity, the application system 101 instructs the user to enter the caller number displayed on the user's communication terminal 104, and compares the caller number entered by the user with the user identity verification code received from the verification code system 102.

In a sense, the disclosed method uses a reverse caller ID process to verify user identity. Instead of asking the user to place a call to reveal the user's caller ID, the disclosed method generates a system caller number (caller ID) which can be revealed to the user by placing a call to the user, so that the user may use the revealed caller number as an identity verification code to verify the user identity.

The caller number is derived from the user identity verification code. In one embodiment, the caller number is the same as user identity verification code. In other words, the user identity verification code is in its entirety the same as the caller number to be used by the communication switching system 103. However, as long as a usable caller number can be derived from the user identity verification code, the user identity verification code itself can be of any form. In one embodiment, at least part of the identity verification code can be used as the caller number.

The verification code system 102 generates the user identity verification code in response to a need for generating a user identity verification code for the application system 101, and sends the generated user identity verification code to the communication switching system 103. The verification code system 102 also sends the generated user identity verification code to the application system 101.

It is appreciated that FIG. 1 shows the method at a conceptual level for illustration only. Various ways may be used to implement the method and the intended functions. For example, in one embodiment, the verification code system 102 is part of the application system 101. As a need for user identity verification arises, the application system 101 calls its own verification code system 102 to generate the verification code. In other embodiment, the communication switching system 103 is also a part of the application system 101, which performs an integrated user verification function to support its own service needs. In another embodiment, the verification code system 102 and the communication switching system 103 are separate systems but are connected to the application system 101 to provide the user identity verification service to the application system 101. The verification code system 102 and the communication switching system 103 may either be owned by the same owner of the application system 101, or by a different party (e.g., a user identity verification service provider). In one embodiment, the verification code system 102 and the communication switching system 103 belong to a system separate from the application system 101 but connected thereto to provide user identity verification service. In yet another embodiment the verification code system 102 and the communication switching system 103 may together constitute an independent system providing centralized user identity verification service to multiple application systems including the application system 101.

The communication switching system 103 can be any suitable communication switching system for connecting stations and terminals of a communications system. The communication switching system 103 may be a telecommunications switching system which transmits signals over separate channels to convey the identities of the calling addresses (e.g., a telephone number of the caller) and the called addresses (e.g., the telephone number of the callee). The communication switching system 103 may include a public switching system, and/or a private switching system. It may have one or a combination of a landline telephone switching system, a mobile phone (cell phone) switching system and an Internet phone switching system, such as a voice over IP (VoIP) switching system.

The user communication terminal 104 is adapted for receiving calls from the communication switching system 103 and is enabled to display caller numbers. The user communication terminal 104 may be any communication device or computing device which is able to display caller numbers. For example, the user communication terminal 104 can be any suitable user-end communication device to receive a telephone call. Specifically, the user communication terminal 104 can be a landline telephone, a cellular phone, an Internet phone, a VoIP phone, or a computer or any computing device (such as PDA) that has a software phone installed.

Figure 2:
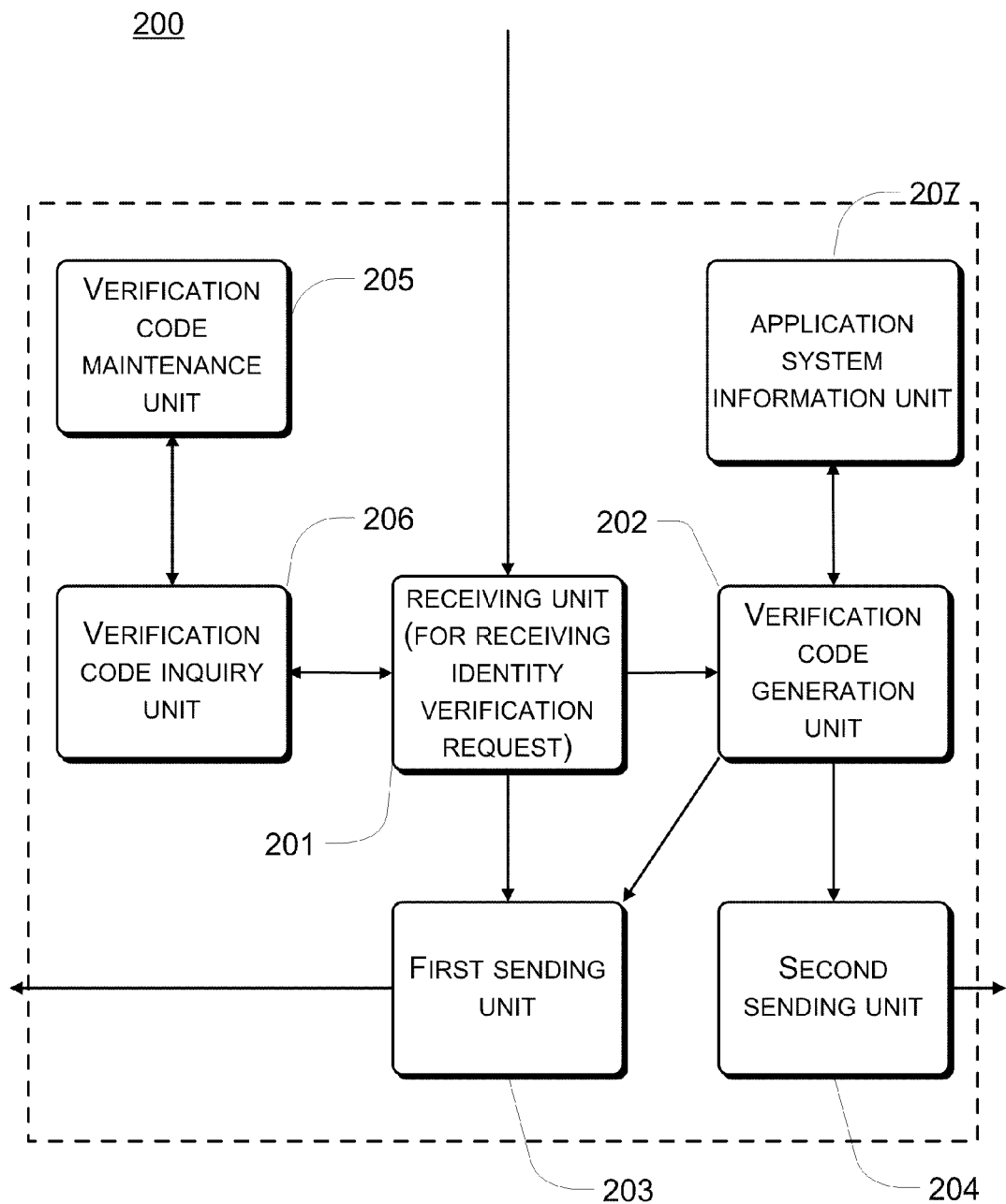
FIG. 2 shows a structural diagram of an exemplary system for generating and maintaining a verification code.

FIG. 2 shows a structural diagram of an exemplary verification code system. In this disclosure, a "unit" is a device which is a tool or machine designed to perform a particular task or function. A unit or device can be a piece of hardware, software, a plan or scheme, or a combination thereof, for effecting a purpose associated with the particular task or function. It is appreciated that some units are described as separate units only for the purpose to illustrate separate functions performed. In actual implementation, such units may be combined into a single unit to perform multiple functions.

As shown in FIG. 2, the verification code system 200 has a receiving unit 201 to receive an identity verification request from an application system (not shown in FIG. 2), a verification code generation unit 202, a first sending unit 203 and a second sending unit 204.

The receiving unit 201 is adapted for receiving a request for generating user identity verification code from an application system and transmitting the request to the verification code generation unit 202. In one embodiment, the request for generating user identity verification code contains a contact number of a present user's communication terminal (e.g., a phone number of the present user's cell phone).

Upon receiving the request for generating user identity verification code, the verification code generation unit 202 generates a user identity verification code and sends the generated user identity verification code to the first sending unit 203 and the second sending unit 204 for further communication. In one embodiment, the verification code generation unit 202 randomly generates a first code and packages the first code with a second code associated with the application system to form the user identity verification code. The first code may be a code body and the second code may be a supplemental code. For instance, the verification code generation unit 202 may append the second code associated with the application in front of the randomly generated first code.

The first sending unit 203 is adapted for sending the user identity verification code to a communication switching system (not shown in FIG. 2). In one embodiment, the first sending unit 230 includes the contact number of the present user's communication terminal in the information sent to the communication switching system. The second sending unit 204 is adapted for sending the user identity verification code to the application system.

In one embodiment, the verification code system 200 may further include a verification code maintenance unit 205 and a verification code inquiry unit 206. The verification code maintenance unit 205 is adapted for storing user information. Examples of the stored user information include a user ID of a user, a user identity verification code and a contact number of the user. For example, the verification code system 200 may save the user identity verification code generated by the verification code generation unit 202 into the verification code maintenance unit 205 for future use. Other associated information such as the user ID and the contact number of the user's communication terminal, may be saved along with the user identification verification code.

The verification code inquiry unit 206 is adapted for inquiring the verification code maintenance unit 205 based on a user ID. Upon receiving a request for user identification verification code, the verification code system 200 may first instruct the verification code inquiry unit 206 to check if the verification code maintenance unit 205 has a stored user identification verification code and the associated information for the present user. To do this, the receiving unit 201 may send a notification message to the verification code inquiry unit 206 upon receiving a request for generating user identity verification code from the application system. The notification message may contain a user ID of present user. If a user identity verification code that corresponds to the user ID is found in the verification code maintenance unit 205, the verification code inquiry unit 206 sends the obtained user identity verification code to the first sending unit 203 and the second sending unit 204 to be further communicated. Otherwise, the verification code inquiry unit 206 may return a message of failed inquiry to the receiving unit 201. The receiving unit 201 then sends a request for generating user identity verification code to the verification code generation unit 202. In this embodiment, the verification code generation unit 202 is called to generate a new user identification verification code only when a stored verification code for the user is not found.

The verification code system 200 may further include an application system information unit 207 to store information such as the supplemental codes associated with the application systems. The verification code generation unit 202 may obtain a supplemental code associated with the application system by inquiring the application system information unit 207.

One example of the application system is an online bank and system. When a user needs to perform a certain transaction involving a fund in an account, for example a transfer of a large sum of money to another account by the user, the application system may require identity verification of the user and allow the transfer only upon successful verification in order to ensure the security of the user account.

An exemplary process of the method is further described below. In this description, the order in which a process is described is not intended to be construed as a limitation, and any number of the described process blocks may be combined in any order to implement the method, or an alternate method.

Figure 3:
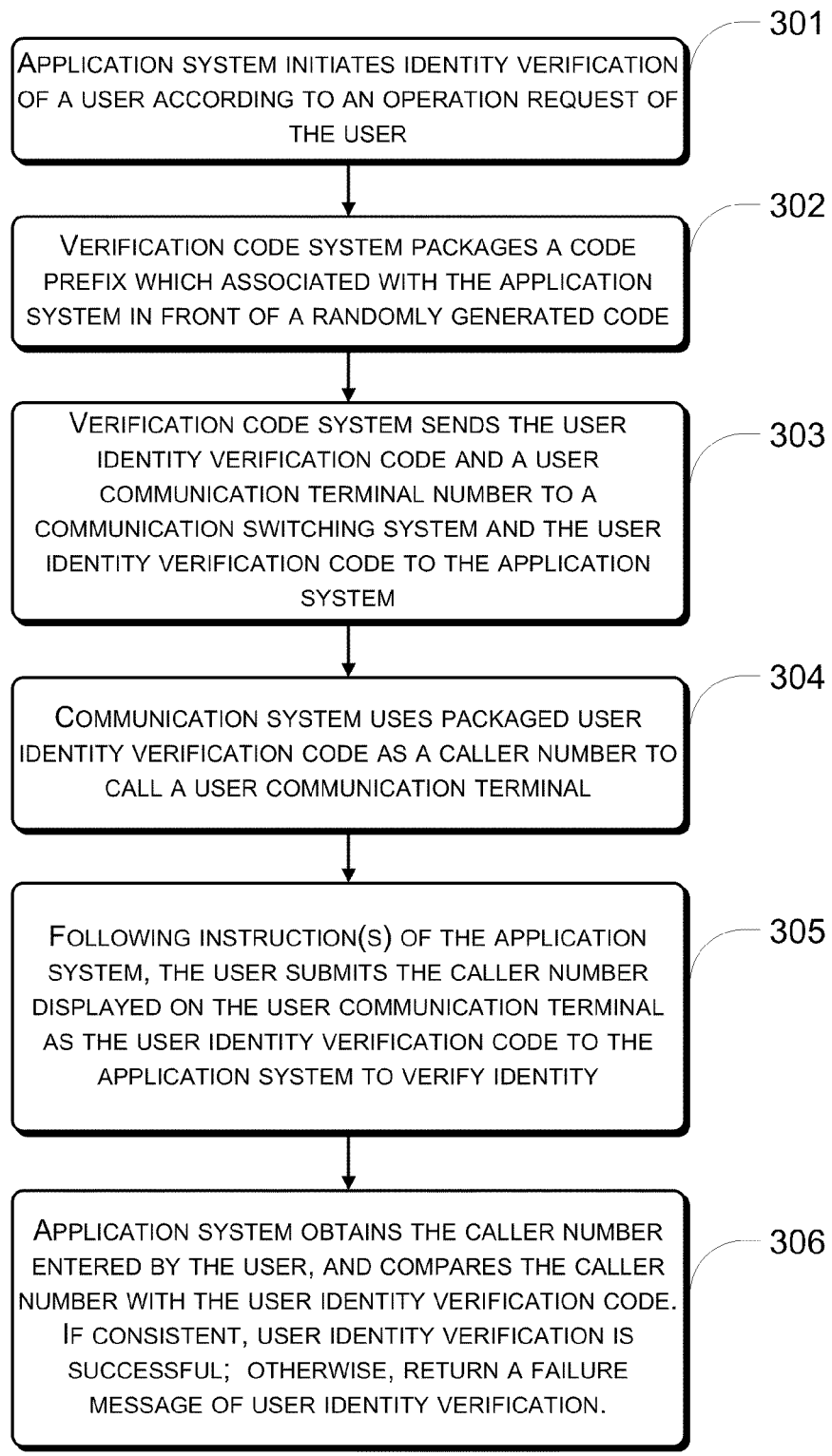
FIG. 3 shows a flow chart of an exemplary process for verifying identity of a user.

FIG. 3 shows a flow chart of an exemplary process for verifying identity of a user. The process is described as follows.

At block 301, an application system initiates identity verification of a user according to a transaction request of the user. To do this, the application system sends a request for generating a user identity verification code to a verification code system (e.g., the verification code system 200). The request for generating user identity verification code may include a contact number of the user's communication terminal.

Because of the needs of user identity verification, the application system may customarily require every user to pre-register a contact number. For instance, when a user registers to become a legitimate user of the application system, the application system instructs the user to register a landline phone or a cell phone that has a caller ID function to be the user's contact phone and requests an associated phone number be provided by the user. If the application system needs to verify the identity of the user, a user identity verification code may be sent to the user in the form of a caller number to be displayed on a screen of the contact phone.

At block 302, the verification code system receives the request for generating user identity verification code from the application system and generates a user identity verification code. In one embodiment, the verification code system may randomly generate a first code having a certain number of digits. The verification code system may then combine the first code with a second code associated with the application system to form a user identity verification code.

For example, the verification code system may add a code prefix associated with the application system in front of a code body randomly generated by the verification code system to form a user identity verification code.

Figure 4:
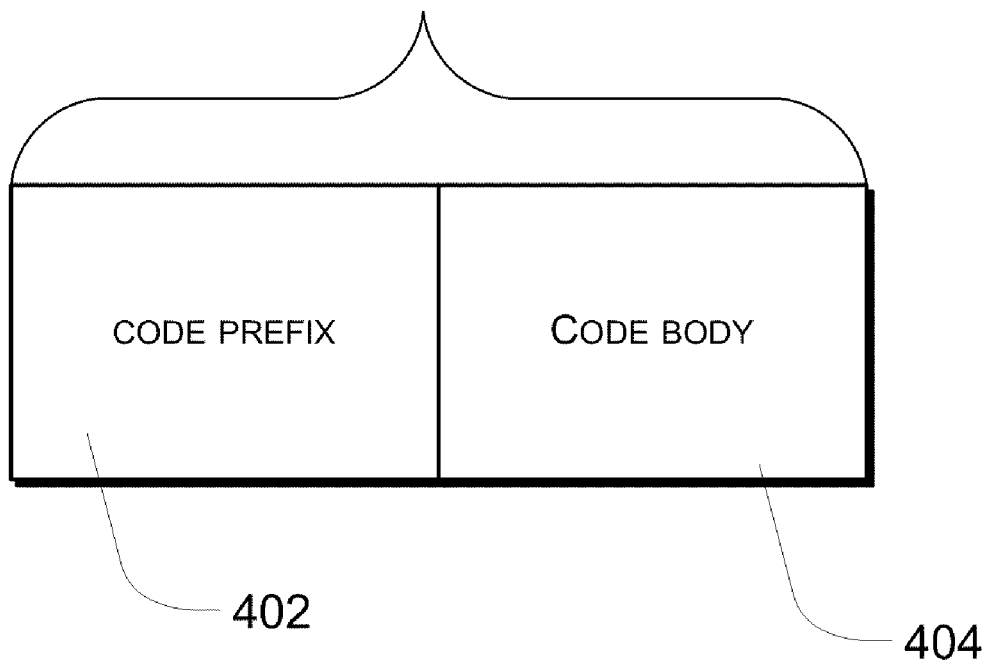
FIG. 4 shows a schematic diagram of an exemplary user identity verification code.

FIG. 4 shows an exemplary user identity verification code. User identity verification code 400 has two segments, namely a code prefix 402 and a code body 404. The number of digits in the code prefix 402 and the number of digits in the code body 404 can be set up beforehand. The exemplary embodiments of the present disclosure do not intend to impose any limitations on these numbers.

If various application systems need user identity verification, the verification code system may set up and store different code prefixes for different application systems. The code prefix is made up of a certain number of digits and is fixed for the same application system. Different code prefixes correspond to different application systems, such that each code prefix can be used to uniquely identify an application system. For example, the code prefix of online China Merchants Bank may be 0001, while the check code prefix of Alipay e-commerce payment platform may be 0002, etc. If a user performs operations on a number of different application systems, the user can quickly recognize which user identity verification code corresponds to which application system after seeing the caller number displayed on the user communication terminal and go to the respective application system to complete the user identification verification.

It is appreciated that different ways of generating the user identity verification code other than that has been described above may be used. For example, instead of adding a code prefix associated with the application system in front of the randomly generated code, the supplemental code associated with the application system may be a suffix put placed behind the randomly generated code. Provided that the supplemental code identifying the application system can be read from the user identity verification code, any combination of the code body and the supplemental code associated with the application system may be used.

At block 303, the verification code system sends the user identity verification code and the contact number to a communication switching system. The verification code system also returns the user identity verification code to the application system.

At block 304, the communication switching system uses the received user identity verification code as a caller number to call the user's communication terminal.

At block 305, following instruction(s) of the application system, the user enters the caller number displayed on the user communication terminal as the user identity verification code for identity verification.

At block 306, the application system obtains the caller number entered by the user and compares the caller number with the user identity verification code received from the verification code system to verify the identity of the user. If the caller number and the user identity verification code are consistent, identity verification of the user is successful. Otherwise, the application system returns a failure message of user identity verification.

If the user successfully passes the described procedure of identity verification, the application system allows the user to continue the requested operation. For example, the application system may switch to a web page displaying the relevant information and links to complete the operation.

In one embodiment, the verification code system may store a user ID of the user, the user identity verification code and the contact number of the user's communication terminal (phone). The verification code system may update the information stored in real time. For example, the verification code system may compare the time at which a user identity verification code was generated with the present time, and check if a threshold for an effective period of the user identity verification code is exceeded. If the threshold is exceeded, records corresponding to the user may be deleted.

Figure 5:
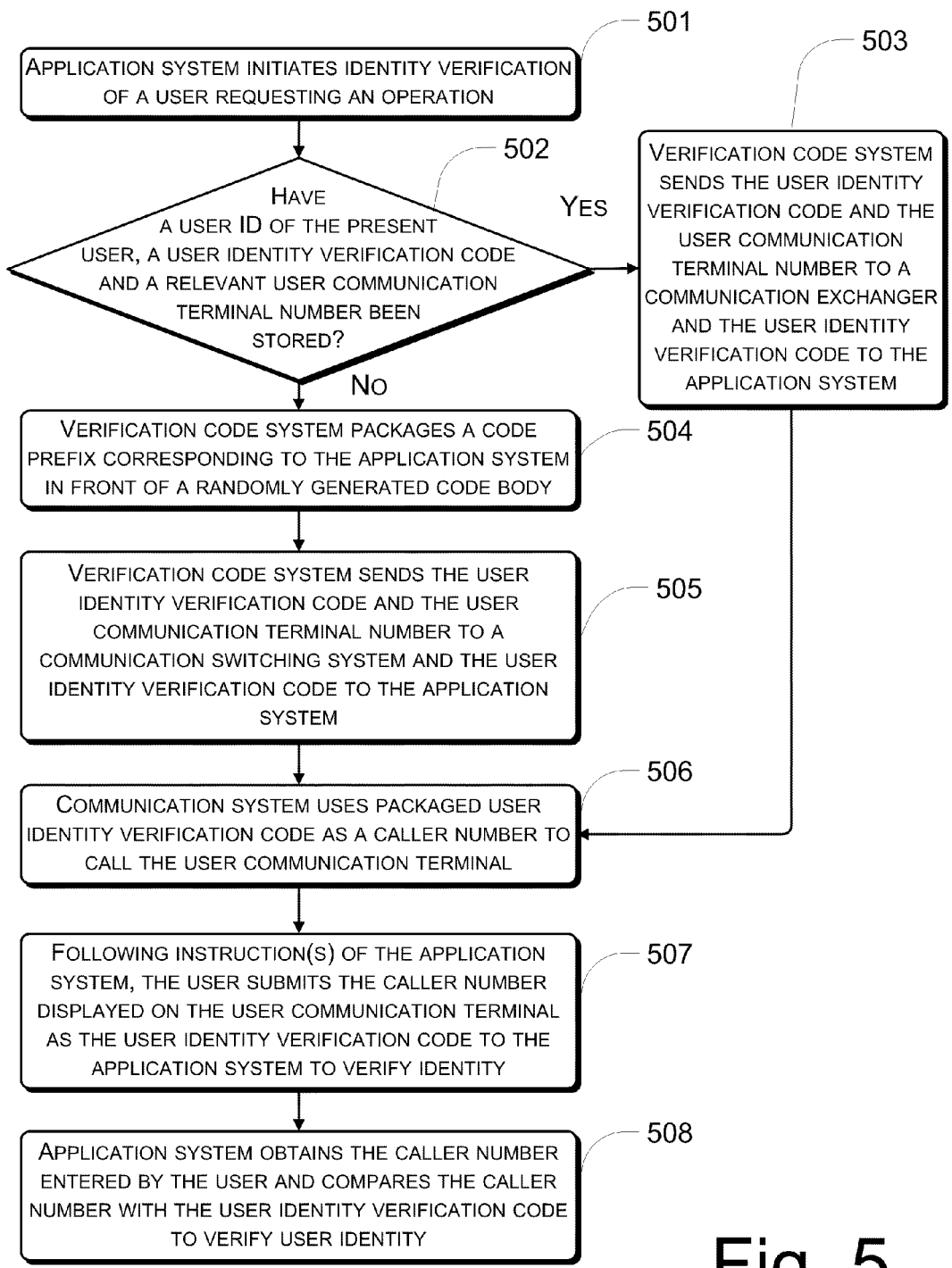
FIG. 5 shows a flow chart of another exemplary process for verifying a user identity.

FIG. 5 shows another exemplary process for verifying identity of a user. The process is disclosed as follows.

Block 501 is the same procedure as block 301. That is, an application system initiates identity verification of a user requesting an operation.

At block 510, upon receiving a request for generating user identity verification code from an application system, the verification code system (e.g., the verification code system 200) inquiries whether a user ID, a user identity verification code and a relevant contact number corresponding to the user have been stored. If yes, the process continues to block 511. Otherwise, the process proceeds to block 504.

At block 511, the verification code system sends the user identity verification code and the contact number to a communication switching system. The verification code system also sends the user identity verification code to the application system. The process proceeds to block 504.

Blocks 502-506 are the same procedure as blocks 302-306 of the previous exemplary embodiment and are not described here again.

It is noted that the disclosed method and system can be implemented using either hardware or software, but our preferably implemented using a combination of software and hardware. The disclosed method itself can be implemented in the form of software products stored in a storage media. The software includes instructions for a computer device (either stand-alone or networked) to execute the method described in the exemplary embodiments of the present disclosure.

In particular, the above-described techniques may be implemented with the help of a computing device, such as a server or a personal computer (PC) having a computing unit, as illustrated below.

Figure 6:
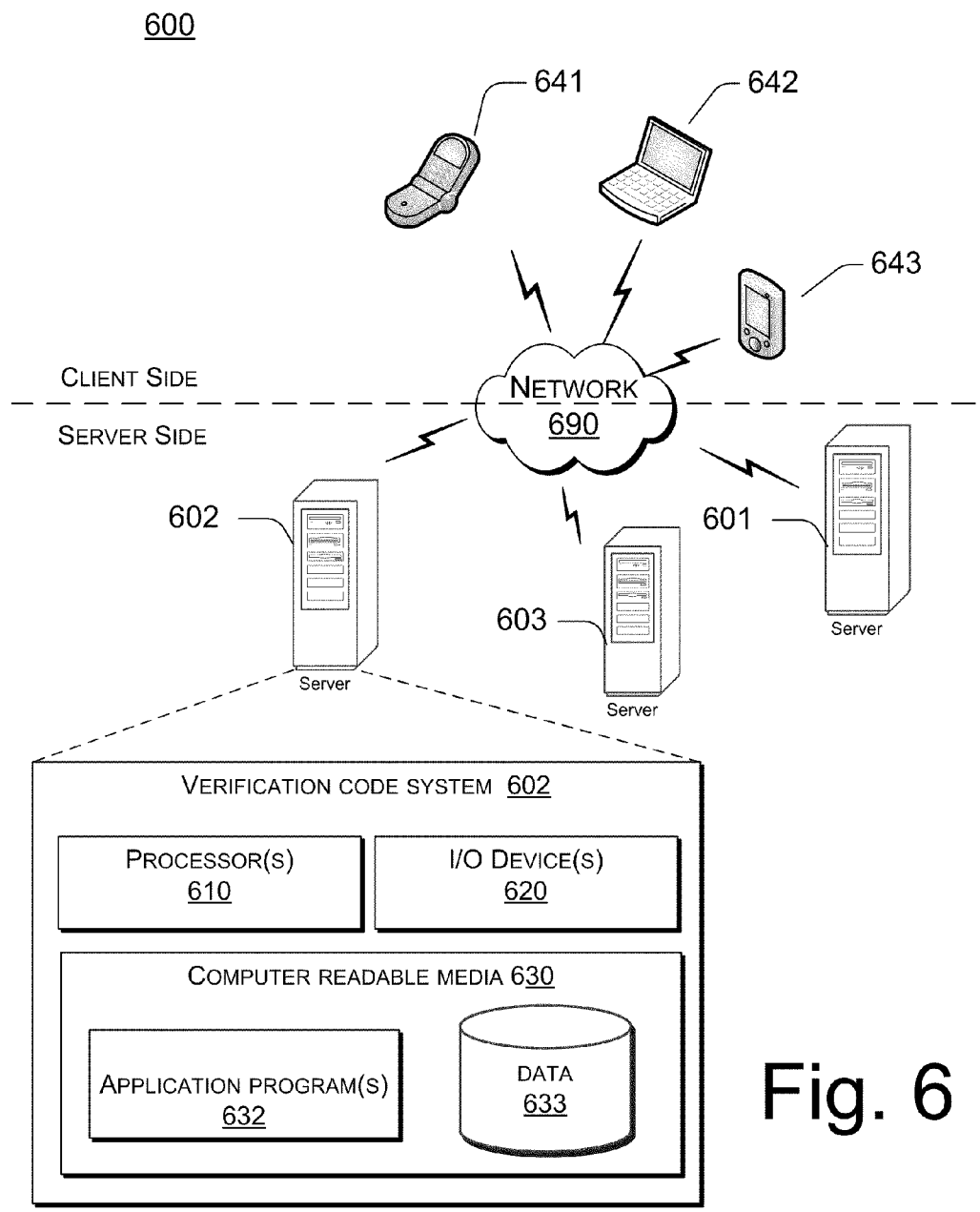
FIG. 6 shows an exemplary environment for implementing the method of the present disclosure.

FIG. 6 shows an exemplary environment for implementing the method of the present disclosure. In illustrated environment 600, some components reside on a client side and other components reside on a server side. However, these components may reside in multiple other locations. Furthermore, two or more of the illustrated components may combine to form a single component at a single location.

An application system 601, a verification code system 602 and a communication switching system 603 are on the server-side, and connected to client-side computing devices (client terminals) such as 641, 642 and 643 through network(s) 690. In one embodiment, the application system 601, the verification code system 602 and the communication switching system 603 are each implemented in a server computer, while client-side computing devices 641, 642 and 643 may each be phone, a computer, or a portable device or a phone, used as a user communication terminal.

As illustrated, the verification code system 602 is implemented with a server which includes processor(s) 610, I/O devices 620, computer readable media 630, and network interface (not shown). The computer readable media 630 stores application program modules 632 and data 634 (such as user identity verification code, contact number, user ID). Application program modules 632 contain instructions which, when executed by processor(s) 610, cause the processor(s) 610 to perform actions of a process for generating user identity verification codes as described herein.

The application system 601 and the communication switching system 603 may each be implemented with a server with its own processor(s), I/O devices, network interface, and computer readable media storing application program modules. The servers of application system 601, the verification code system 602, and the communication switching system 603 work in cooperation for user identity verification is described herein. It is noted that the application system 601, the verification code system 602 and the communication switching system 603 may each be implemented with any suitable computing device, and may each be implemented with multiple servers such as a cluster of servers. On the other hand, any of these systems may be combined into a server or a cluster of servers. For example, the verification code system 602 and the communication switching system 603 may be combined as an integrated system implemented in one or more servers, and either or both may be further combined with the application system 601. Any of these systems may be connected to form an LAN or a network under the same root domain. In one embodiment, the verification code system 602 and the communication switching system 603 provide a centralized user identification verification service to multiple application systems like the application system 601 connected to the network 690.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

Using the generated user identity verification code as a caller number to call a user communication terminal which is enabled to display the caller number, the disclosed method and system provides a simple and reliable way to deliver a verification code to a user and verify the identity of the user. Typically, caller ID display is reliable. Even if the call is not answered by the user, or is interrupted in the middle, the caller ID display function can still show the caller number. The present disclosure potentially avoids the possible text message loss or delay in the text message verification, and the possible failure of user identity verification because of the poor communication accuracy in the telephone verification. This helps to improve the reliability and the work efficiency of user identification verification. Moreover, since the disclosed method allows a user to obtain a user identity verification code without answering a call, the present disclosure can reduce the cost on the user's behalf and therefore may find easier to be adopted.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for verifying identity of a user, the method comprising:
    obtaining a user identity verification code, wherein at least a portion of the user identity verification code comprises a caller number;
    initiating a call to a user communication terminal, wherein the user identity verification code is conveyed to a user of the user communication terminal, via caller ID, as the caller number displayed by, the user communication terminal; and providing at least the caller number to an application system to enable the application system to verify the user's identity by matching a user input number with the caller number.

2. The method as recited in claim 1, wherein obtaining a user identity verification code comprises:
   receiving a request from the application system; and
   generating the user identity verification code responsive to the request.

3. The method as recited in claim 1, wherein the application system has a user account, and further comprising:
   receiving, from the application system, a request for generating the user identity verification code responsive to the user attempting to conduct an account operation.

4. The method as recited in claim 1, wherein the initiating a call to the user communication terminal is carried out by a communication switching system, the method further comprising:
   sending a contact number of the user communication terminal and the caller number to the communication switching system.

5. The method as recited in claim 1, wherein the user communication terminal comprises a phone.

6. The method as recited in claim 1, wherein obtaining a user identity verification code comprises:
   generating at least a segment of the user identification verification code as a random number.

7. The method as recited in claim 1, wherein the user identification verification code comprises one or more digits which can be used to identify the application system.

8. The method as recited in claim 1, wherein obtaining a user identity verification code is carried out by a verification code system, the method further comprising:
   receiving at the verification code system a request for generating user identity verification code from the application system, wherein the request contains a contact number of the user communication terminal.

9. The method as recited in claim 1, wherein obtaining a user identity verification code comprises:
   randomly generating a code body having a plurality of digits;
   affixing a supplemental code to the code body, the supplemental code being associated with an application system; and
   packaging the code body and the supplemental code to form the user identity verification code.

10. The method as recited in claim 9, wherein the supplemental code is a prefix code placed in front of the code body.

11. The method as recited in claim 9, wherein the supplemental code uniquely corresponds to the application system.

12. The method as recited in claim 1, further comprising:
   saving an identifier of the user, the user identity verification code and a contact number of the user communication terminal.

13. The method as recited in claim 1, further comprising:
   saving an identifier of the user and the user identity verification code;
   retrieving the user identification verification code according to the identifier of the user; and
   sending the retrieved user identification verification code to a communication switching system to place the call to the user communication terminal.

14. A method for verifying identity of a user, the method comprising:
   obtaining a user identity verification code, at least part of the user identity verification code specifying a caller number;
   communicating the caller number to the user by placing a call from the caller number to a user communication terminal which is capable of displaying the caller number upon receiving the call;
   instructing the user to enter the caller number displayed, via caller ID, upon receiving the call;
   receiving a user input number; and
   checking the user input number against the caller number to verify user identity.

15. The method as recited in claim 14, wherein the user communication terminal comprises a phone.

16. The method as recited in claim 14, wherein placing a call from the caller number to the user communication terminal is carried out by an Internet phone searching system.

17. A system for user identity verification, the system comprising:
   an application system for instructing a user to enter a caller number displayed, via caller ID, on a user communication terminal of the user and for requesting a user identity verification code responsive to the user attempting to conduct an account operation;
   a verification code system for generating a user identity verification code upon receiving a request from the application system, and for communicating the user identity verification code to the application system, wherein the user identity verification code comprises a caller number; and
   a communication switching system for placing a call from the caller number to a contact number of a user communication terminal capable of displaying the caller number upon receiving the call, wherein the contact number is associated with a user of the application system, and the caller number displayed on the user communication terminal is provided to the application system to verify the user's identity.

18. The system as recited in claim 17, wherein the contact number of the user communication terminal is received from the application system.

19. The system as recited in claim 17, wherein the application system is a first application system of multiple application systems, wherein the verification code system is configured for supporting user identity verification codes of multiple application systems, and wherein the caller number comprises at least one digit serving as an identifier of the first application system.

20. A verification code system, comprising:
   an application system for instructing a user to enter a caller number displayed, via caller ID, on a user communication terminal of the user and for requesting a user identity verification code responsive to the user attempting to conduct an account operation;
   a verification code generation unit for generating the user identity verification code upon receiving the request from the application system, at least part of the user identity verification code providing a caller number; and
   a communication unit for communicating the caller number to a communication switching system and the application system, and instructing the communication switching system to place a call originating from the caller number to a user communication terminal, the user communication terminal being capable of displaying the caller number.

* * * * *